(12) United States Patent
Ok

(10) Patent No.: US 9,280,415 B2
(45) Date of Patent: Mar. 8, 2016

(54) SEMICONDUCTOR DEVICE, SEMICONDUCTOR SYSTEM AND CONTROL METHOD OF SEMICONDUCTOR DEVICE

(71) Applicant: SK hynix Inc., Gyeonggi-do (KR)

(72) Inventor: Sung-Hwa Ok, Gyeonggi-do (KR)

(73) Assignee: SK Hynix Inc., Gyeonngi-do (KR)

( * ) Notice: Subject to any disclaimer, the term of this patent is extended or adjusted under 35 U.S.C. 154(b) by 315 days.

(21) Appl. No.: 14/086,565

(22) Filed: Nov. 21, 2013

(65) Prior Publication Data

US 2014/0372839 A1 Dec. 18, 2014

(30) Foreign Application Priority Data

Jun. 17, 2013 (KR) ........................ 10-2013-0068877

(51) Int. Cl.
*G06F 11/10* (2006.01)
*G11C 29/00* (2006.01)
*G06F 13/10* (2006.01)

(52) U.S. Cl.
CPC .......... *G06F 11/1004* (2013.01); *G06F 13/102* (2013.01)

(58) Field of Classification Search
CPC . G06F 11/1004; G06F 11/1076; G06F 21/00; G06F 13/102; G06F 13/10; G05B 19/05; G05B 19/054

USPC ........ 714/807, 763, 768, 741, 742, 25, 33, 52
See application file for complete search history.

(56) References Cited

U.S. PATENT DOCUMENTS

| 7,752,525 | B2 * | 7/2010 | Pisek .................. H03M 13/091 |
| | | | 702/189 |
| 8,468,417 | B2 * | 6/2013 | Asnaashari ............. G06F 11/10 |
| | | | 702/189 |
| 2005/0282501 | A1 * | 12/2005 | Oura .................... H04B 1/1027 |
| | | | 455/67.13 |
| 2015/0193463 | A1 * | 7/2015 | Merriman ......... G06F 17/30368 |
| | | | 707/625 |

FOREIGN PATENT DOCUMENTS

| KR | 1020120074897 | 7/2012 |
| KR | 1020120098327 | 9/2012 |

* cited by examiner

*Primary Examiner* — Christine Tu
(74) *Attorney, Agent, or Firm* — IP & T Group LLP

(57) ABSTRACT

A semiconductor device includes a mode register set suitable for generating a first internal control signal and a second internal control signal, a per-DRAM addressability (PDA) driving unit suitable for resetting the mode register set in response to the first internal control signal and an input value of data inputted through a data pad, and a cycle redundancy check (CRC) driving unit suitable for performing a CRC operation by checking whether or not data are correctly inputted through the data pad without an error in response to the first internal control signal and the second internal control signal.

20 Claims, 3 Drawing Sheets

SEMICONDUCTOR DEVICE, SEMICONDUCTOR SYSTEM AND CONTROL METHOD OF SEMICONDUCTOR DEVICE

CROSS-REFERENCE TO RELATED APPLICATIONS

The present application claims priority of Korean Patent Application No. 10-2013-0068877, filed on Jun. 17, 2013, which is incorporated herein by reference in its entirety.

BACKGROUND

1. Field

Exemplary embodiments of the present invention relate to a semiconductor design technology, and more particularly, to a semiconductor device, a semiconductor system, and a control method of the semiconductor device.

2. Description of the Related Art

In general, a semiconductor device such as a double data rate synchronous dynamic random access memory (DDR SDRAM) receives data from an external controller and performs a plurality of operations. However, in case that an error occurs in a data transmission, the semiconductor device receives erroneous data, and this may deteriorate the reliability of the semiconductor device. Recently, as a data processing speed of the semiconductor device is increased, the amount of data received from the external controller is increased, and a transmission speed is increased. As a result, the number of errors, which occur in the data transmission, may be increased. Thus, schemes for overcoming the above-described problem have been developed. One of the schemes is to use a cyclic redundancy check code (CRC) code.

The CRC code is generated based on data to be transmitted from the external controller. The external controller transmits the data with the CRC code to the semiconductor device. Subsequently, the semiconductor device performs an operation based on the CRC code and the data transmitted from the external device, and generates an operated result. An error, which occurs during a data transmission, may be detected using the operated result.

FIG. 1 is a block diagram illustrating a conventional semiconductor device.

As shown in FIG. 1, a semiconductor device includes a controller 110 and a semiconductor device 120.

The controller 110 transmits data DAT and a CRC code corresponding to the data DAT to the semiconductor device 120. The semiconductor device 120 performs an operation based on the CRC code and the data DAT, and detects an error, which occurs in a data transmission. The semiconductor device 120 transmits detected error information INF_ERR to the controller 110. The controller 110 determines whether or not an error occurred in the data transmission based on the detected error information INF_ERR. If the error occurred in the data transmission, the controller 110 re-transmits the data to the semiconductor device 120.

Meanwhile in a per-DRAM addressability (hereinafter, referred to as a 'PDA') mode and a CRC mode, data are inputted through a data pad. In the CRC mode, the data pad is used in calculating the probability of an error during the data transmission. That is, the data pad has a data value in the CRC mode. However, in the PDA mode, the data pad is used in selecting a specific device using a DRAM module but does not have a data value. Thus, in the PDA mode, the data pad does not need a CRC operation, and may be incorrectly operated if the data pad receives error information through the CRC operation.

In case that the PDA mode and the CRC mode are simultaneously entered, a conflict between an operation of the PDA mode and an operation of the CRC mode may occur, and this may cause a malfunction.

SUMMARY

Exemplary embodiments of the present invention are directed to a semiconductor device, a semiconductor system, and a control method of the semiconductor device capable of preventing a malfunction generated by a conflict between an operation of a PDA mode and an operation of a CRC mode when the PDA mode and the CRC mode are simultaneously entered.

In accordance with an exemplary embodiment of the present invention, a semiconductor device includes a mode register set suitable for generating internal control signals including a first internal control signal and a second internal control signal, a per-DRAM addressability (PDA) driving unit suitable for resetting the mode register set in response to the first internal control signal and an input value of data inputted through a data pad, and a cycle redundancy check (CRC) driving unit suitable for performing a CRC operation by checking whether or not data are correctly inputted through the data pad without an error in response to the first internal control signal and the second internal control signal.

In accordance with an exemplary embodiment of the present invention, a semiconductor system includes a memory device suitable for performing one of a per-DRAM addressability (PDA) operation and a cycle redundancy check (CRC) operation in response to a plurality of internal control signals generated by a mode register setting operation, and a memory controller suitable for controlling the memory device, wherein the memory device comprises a per-DRAM addressability (PDA) driving unit suitable for resetting a mode register set in response to a first internal control signal of the plurality of internal control signals and an input value of data inputted through a data pad, and a cycle redundancy check (CRC) driving unit suitable for performing a CRC operation by checking whether or not data are correctly inputted through the data pad without an error in response to the first internal control signal and a second internal' control signal of the plurality of internal control signals.

In accordance with an exemplary embodiment of the present invention, a control method of a semiconductor device includes generating internal control signals including a first internal control signal and a second internal control signal by a mode register setting operation, resetting the mode register set in response to the first internal control signal and an input value of data inputted through a data pad, and performing a CRC operation by detecting whether data are inputted through the data pad without an error in response to the first internal control signal and the second internal control signal.

DETAILED DESCRIPTION

Figure 1:
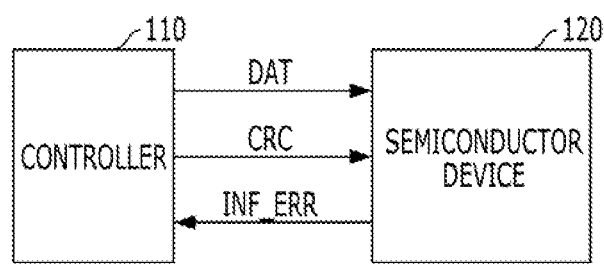
FIG. 1 is a block diagram illustrating a conventional semiconductor device.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention.

The drawings are not necessarily to scale and in some instances, proportions may have been exaggerated in order to clearly illustrate features of the embodiments. In this specification, specific terms have been used. The terms are used to describe the present invention, and are not used to qualify the sense or limit the scope of the present invention.

It is also noted that in this specification, 'and/or' represents that one or more of components arranged before and after 'and/or' is included. Furthermore, "connected/coupled" refers to one component not only directly coupling another component but also indirectly coupling another component through an intermediate component. In addition, a singular form may include a plural form as long as it is not specifically mentioned in a sentence. Furthermore, 'include/comprise' or 'including/comprising' used in the specification represents that one or more components, steps, operations, and elements exists or are added.

Figure 2:
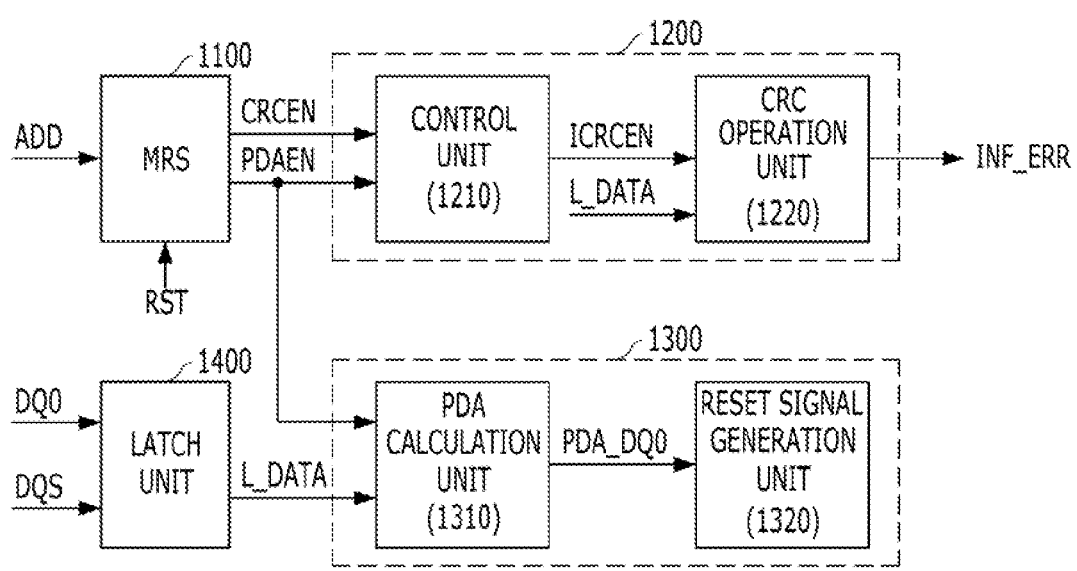
FIG. 2 is a block diagram illustrating a semiconductor device in accordance with an exemplary embodiment of the present invention.

FIG. 2 is a block diagram illustrating a semiconductor device in accordance with an exemplary embodiment of the present invention.

As shown in FIG. 2, the semiconductor device in accordance with an exemplary embodiment of the present invention includes an MRS 1100, a CRC driving unit 1200, and a PDA driving unit 1300. Moreover, the semiconductor device may further include a latch unit 1400.

The MRS 1100 generates and outputs a plurality of internal control signals PDAEN and CRCEN by a setting operation of the MRS 1100 in response to an address signal ADD. The CRC driving unit 1200 performs a CRC operation by detecting whether or not data are correctly inputted through a data pad (not shown) without an error in response to a first internal control signal PDAEN and a second internal control signal CRCEN. The PDA driving unit 1300 resets the MRS 1100 in response to the first internal control signal PDAEN and the data input through the data pad. Furthermore, the latch unit 1400 latches data DQ0 input through the data pad in response to a data strobe signal DQS to output latched data L_DATA to the CRC driving unit 1200 and the PDA driving unit 1300.

The CRC driving unit 1200 includes a control unit 1210 and a CRC operation unit 1220. The control unit 1210 receives the first and second internal control signals PDAEN and CRCEN. When the first internal control signal PDAEN and the second internal control signal CRCEN are simultaneously activated, the control unit 1210 inactivates the second internal control signal CRCEN and outputs an inverted second internal control signal ICRCEN.

Meanwhile, in case of double data rate 4 (DDR4) DRAMs, when data is received through a data pad, a value of the data is classified into '0' or '1' on the basis of a reference value. Herein, the DRAMs may internally generate the reference value, and may operate correctly when a minimum value of the reference value is properly set.

However, since a speed, a noise, or a circumstance of each of the DRAMs is not same, an optimized minimum value of the DRAM is different from each other. Thus, in a PDA mode, the DRAMs may be individually controlled in a DRAM module.

For example, in case of first to ninth DRAMs in a DRAM module, it is assumed that at least one predetermined DRAM is selected when a logic low value is inputted through the data pad. When the PDA mode is entered by an MRS, the data pad may be used in selecting the predetermined DRAM instead of having a data value.

For example, if a logic high value is input through the data pad, any of the DRAMs does not perform an operation in response to an MRS command. If a logic low value is input through the data pad, the predetermined DRAM performs an operation corresponding to the MRS command. That is, the MRS command is commonly input, but a logic high value or a logic low value is individually input to each DRAM in the DRAM module through the data pad.

After the DDR4 DRAM, as an operation voltage of the DRAM is lowered and a speed of the DRAM is increased, an error probability in a data transmission becomes increased. Thus, a CRC code is used in checking whether the data are correctly transferred. In case of a write operation of the DRAM, an error of a data transmission when a system transfers data to the DRAM is detected in the CRC mode. That is, in the CRC mode, data may be transferred through the data pad. In other words, the data pad may have a data value in the CRC mode.

On the other hand, in the PDA mode, the data pad is used in selecting a specific DRAM in a DRAM module, and data dose not transfer through the data pad. In other words, in the PDA mode, the data pad does not have a data value. Thus, in the PDA mode, a CRC operation is not performed through the data pad. If error caused by the CRC operation is outputted through the data pad, a malfunction may be performed in the DRAM Thus, if the CRC mode and the PDA mode are simultaneously entered, a malfunction may occur in performing the CRC mode and the PDA mode. Thus, in the exemplary embodiment, the control unit 1210 of the CRC driving unit 1200 inactivates the second internal control signal CRCEN and outputs the inverted second internal control signal ICRCEN in response to a priority sequence determined by internally controlling the CRC mode and the PDA mode.

The CRC operation unit 1220 performs the CRC operation on the latched data L_DATA outputted from the latch unit 1400 when the inverted second internal control signal ICRCEN outputted from the control unit 1210 is activated. That is, the CRC operation unit 1220 does not perform the CRC operation on the latched data L_DATA when the first internal control signal PDAEN and the second internal control signal CRCEN are simultaneously activated.

The PDA driving unit 1300 includes a PDA calculation unit 1310 and a reset signal generation unit 1320.

The PDA calculation unit 1310 outputs a determination signal PDA_DQ0 for determining whether an MRS command is performed in response to the first internal control signal PDAEN and the latched data L_DATA. In particular, when the first internal control signal PDAEN is activated, the PDA calculation unit 1310 outputs the determination signal PDA_DQ0 based on the latched data L_DATA. The determination signal PDA_DQ0 does not have a data value, and is used in determining whether the MRS command is performed or not.

The reset signal generation unit 1320 generates a reset signal RST for resetting the MRS in response to the determination signal PDA_DQ0 outputted from the PDA calculation unit 1310. Herein, if the determination signal PDA_DQ0 has a logic high value, the reset signal RST is activated and the MRS 1100 is reset in response to the reset signal RST so that the MRS command is not performed. If the determination signal PDA_DQ0 has a logic low value, the MRS command is performed.

Figure 3:
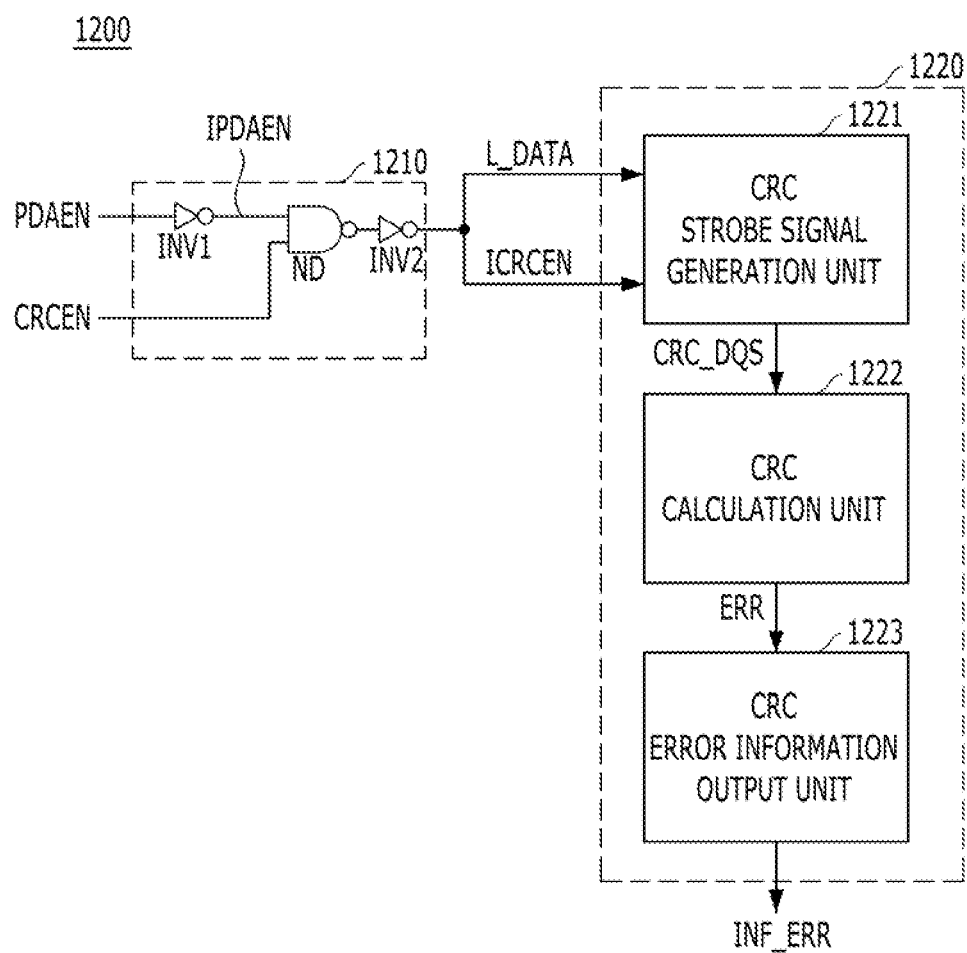
FIG. 3 is a detailed block diagram illustrating a CRC driving unit shown in FIG. 2 in accordance with an exemplary embodiment of the present invention.

FIG. 3 is a detailed block diagram illustrating the CRC driving unit 1200 shown in FIG. 2 in accordance with an exemplary embodiment of the present invention.

As shown in FIG. 3, the CRC driving unit 1200 includes the control unit 1210 and the CRC operation unit 1220.

The control unit 1210 includes a first inverter INV1, a NAND gate ND and a second inverter INV2. The first inverter INV1 inverts the first internal control signal PDAEN and outputs an inverted first internal control signal IPDAEN. The NAND gate ND performs a NAND operation on the inverted first internal control signal IPDAEN and the second internal control signal CRCEN and outputs a result of the NAND operation. The second inverter INV2 inverts the result of the NAND operation and outputs the inverted second internal control signal ICRCEN.

Thus, when the first internal control signal PDAEN and the second internal control signal CRCEN are simultaneously activated, the inverted second internal control signal ICRCEN is inactivated and outputted.

That is the control unit 1210 determines the priority sequence of the first internal control signal PDAEN and the second internal control signal CRCEN and outputs the inverted second internal control signal ICRCEN in response to the priority sequence. When the first internal control signal PDAEN is inactivated, the second internal control signal CRCEN is output as the inverted second internal control signal ICRCEN. When the first internal control signal PDAEN is activated, the inverted second internal control signal ICRCEN is output to have a fixed logic low level. Thus, the second internal control signal CRCEN may be dependent on the first internal control signal PDAEN.

The CRC operation unit 1220 includes a CRC strobe signal generation unit 1221, a CRC calculation unit 1222, and a CRC error information output unit 1223. The CRC operation unit 1220 operates when the inverted second internal control signal ICRCEN is activated.

The CRC strobe signal generation unit 1221 receives the latched data L_DATA through the latch unit 1400 when the inverted second internal control signal ICRCEN is activated, and generates a CRC strobe signal CRC_DQS in response to the inverted second internal control signal ICRCEN. The CRC calculation unit 1222 calculates an error value ERR using the CRC strobe signal CRC_DQS. The error information output unit 1223 outputs error information INF_ERR regarding an error state of the latched data L_DATA based on the calculated error value ERR.

Figure 4:
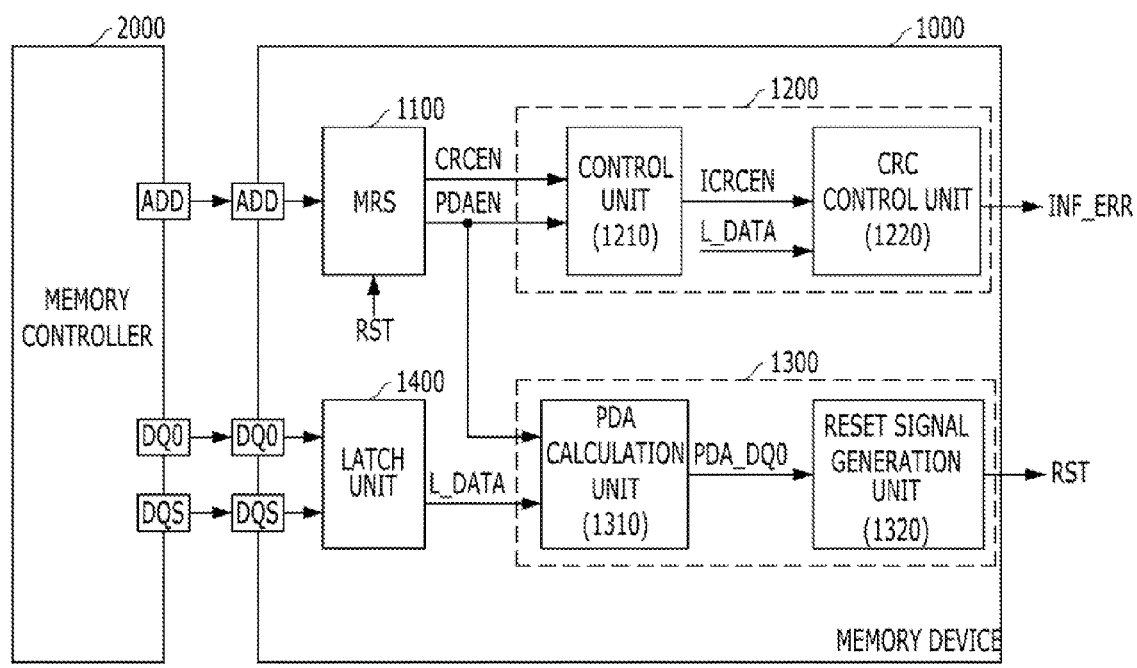
FIG. 4 is a block diagram illustrating a semiconductor system in accordance with an exemplary embodiment of the present invention.

FIG. 4 is a block diagram illustrating a semiconductor system in accordance with an exemplary embodiment of the present invention.

As shown in FIG. 4, the semiconductor system in accordance with the embodiment of the present invention includes a memory device 1000 and a memory controller 2000.

The memory device 1000 enters one of a PDA mode and CRC mode in response to a plurality of internal control signals, which are generated by a mode register setting operation. Herein, since a configuration and an operation of the memory device 1000 are substantially the same as those of the semiconductor device shown in FIG. 2, the descriptions of the memory device 1000 will be omitted.

The memory controller 2000 may control the memory device 1000. The memory controller 2000 generates an address signal ADD for the mode register setting operation and transmits data DQ0 for a in data latch operation to the memory device 1000 through a data pad. Herein, a data strobe signal DQS is transmitted to the memory device 1000 for the data latch operation.

As described above, the semiconductor device in accordance with an exemplary embodiment of the present invention may control the PDA mode or the CRC mode based on an internal priority sequence of the semiconductor device when the PDA mode and the CRC mode are simultaneously entered based on a mode register setting information. Thus, the semiconductor device may prevent a malfunction from being performed.

While the present invention has been described with respect to the specific embodiments, it will be apparent to those skilled in the art that various changes and modifications may be made without departing from the spirit and scope of the invention as defined in the following claims.

What is claimed is:

1. A semiconductor device comprising:
  a mode register set suitable for generating internal control signals including a first internal control signal and a second internal control signal;
  a per-DRAM addressability (PDA) driving unit suitable for resetting the mode register set in response to the first internal control signal and an input value of data inputted through a data pad; and
  a cycle redundancy check (CRC) driving unit suitable for performing a CRC operation by checking whether or not data are correctly inputted through the data pad without an error in response to the first internal control signal and the second internal control signal.

2. The semiconductor device of claim 1, wherein the PDA driving unit resets the mode register set when the first internal control signal is activated.

3. The semiconductor device of claim 1, wherein the CRC driving unit does not perform the CRC operation when the first internal control signal and the second internal control signal are simultaneously activated.

4. The semiconductor device of claim 1, further comprising:
  a data latch unit suitable for latching the data inputted through the data pad.

5. The semiconductor device of claim 1, wherein the CRC driving unit comprises:
  a control unit suitable for inactivating and outputting an inverted second internal control signal when the first internal control signal and the second internal control signal are simultaneously activated; and
  a CRC operation unit suitable for performing the CRC operation on the data in response to the inverted second internal control signal.

6. The semiconductor device of claim 5, wherein the control unit comprises:
  a first logic gate suitable for inverting the first internal control signal and outputting an inverted first internal control signal;
  a second logic gate suitable for performing a NAND operation on the inverted first internal control signal and the second internal control signal; and
  a third logic gate suitable for inverting an output of the second logic gate.

7. The semiconductor device of claim 1, wherein the PDA driving unit comprises:
  a PDA calculation unit suitable for outputting a determination signal representing a state of the mode register set in response to the first internal control signal and the data; and
  a reset signal generating unit suitable for resetting the mode register set in response to the determination signal.

8. A semiconductor system comprising:
  a memory device suitable for performing one of a per-DRAM addressability (PDA) operation and a cycle redundancy check (CRC) operation in response to a plurality of internal control signals generated by a mode register setting operation; and
  a memory controller suitable for controlling the memory device,
  wherein the memory device comprises:
    a per-DRAM addressability (PDA) driving unit suitable for resetting a mode register set in response to a first internal control signal of the plurality of internal control signals and an input value of data inputted through a data pad; and
    a cycle redundancy check (CRC) driving unit suitable for performing a CRC operation by checking whether or not data are correctly inputted through the data pad without an error in response to the first internal control signal and a second internal control signal of the plurality of internal control signals.

9. The semiconductor device of claim 8, wherein the PDA driving unit resets the mode register set when the first internal control signal is activated.

10. The semiconductor device of claim 8, wherein the CRC driving unit does not perform the CRC operation when the first internal control signal and the second internal control signal are simultaneously activated.

11. The semiconductor system of claim 8, further comprising:
  a data latch unit suitable for latching the data inputted through the data pad.

12. The semiconductor system of claim 8, wherein the CRC driving unit comprises:
  a control unit suitable for inactivating and outputting an inverted second internal control signal when the first internal control signal and the second Internal control signal are simultaneously activated; and
  a CRC operation unit suitable for performing the CRC operation on the data in response to the inverted second internal control signal.

13. The semiconductor system of claim 12, wherein the control unit comprises:
  a first logic gate suitable for inverting the first internal control signal and for outputting an inverted first internal control signal; and
  a second logic gate suitable for performing a NAND operation on the inverted first internal control signal and the second internal control signal; and
  a third logic gate suitable for inverting an output of the second logic gate.

14. The semiconductor system of claim 8, wherein the PDA driving unit comprises:
  a PDA calculation unit suitable for outputting a determination signal representing a state of the mode register set in response to the first internal control signal and the data; and
  a reset signal generating unit suitable for resetting the ode register set in response to the determination signal.

15. A control method of a semiconductor device comprising:
  generating internal control signals including a first internal control signal and a second internal control signal by a mode register setting operation;
  resetting a mode register set in response to the first internal control signal and an input value of data inputted through a data pad; and
  performing a CRC operation by detecting whether data are inputted through the data pad without an error in response to the first internal control signal and the second internal control signal.

16. The control method of claim 15, wherein the mode register set is reset when the first internal control signal is activated.

17. The control method of claim 15, wherein the CRC operation is not performed when the first internal control signal and the second internal control signal are simultaneously activated.

18. The control method of claim 15, further comprising:
  latching the data inputted through the data pad.

19. The control method of claim 15, wherein the detecting whether data are inputted through the data pad without an error comprises:
  inactivating and outputting an inverted second internal control signal when the first internal control signal and the second internal control signal are simultaneously activated; and
  performing the CRC operation on the data in response to the inverted second internal control signal.

20. The control method of claim 15, wherein the resetting the mode register set comprises:
  generating a determination signal representing a state of the mode register set in response to the first internal control signal and the data; and
  resetting the mode register set in response to the determination signal.

* * * * *